US012668180B2

(12) United States Patent
Maeda

(10) Patent No.: US 12,668,180 B2
(45) Date of Patent: Jun. 30, 2026

(54) AWAKENING SUPPORT APPARATUS AND AWAKENING SUPPORT METHOD

(71) Applicant: Panasonic Automotive Systems Co., Ltd., Kanagawa (JP)

(72) Inventor: Kazuhiko Maeda, Osaka (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 57 days.

(21) Appl. No.: 18/887,266

(22) Filed: Sep. 17, 2024

(65) Prior Publication Data

US 2025/0010792 A1     Jan. 9, 2025

Related U.S. Application Data

(63) Continuation of application No. PCT/JP2023/003522, filed on Feb. 3, 2023.

(30) Foreign Application Priority Data

Mar. 30, 2022     (JP) ................................. 2022-055203

(51) Int. Cl.
B60Q 9/00 (2006.01)
B60G 9/00 (2006.01)
(Continued)

(52) U.S. Cl.
CPC ............. B60G 9/00 (2013.01); G06V 20/597 (2022.01); G08G 1/0967 (2013.01)

(58) Field of Classification Search
CPC .. G07F 17/32; G07F 17/3244; G07F 17/3262; G07F 17/3267; G07F 17/3286;
(Continued)

(56) References Cited

U.S. PATENT DOCUMENTS 9,335,819 B1 * 5/2016 Jaeger ...................... G09B 5/06
9,606,622 B1 * 3/2017 Brothers ................. G06F 3/013
(Continued)

FOREIGN PATENT DOCUMENTS

JP     2017-059043 A     3/2017
JP     2019-029000 A     2/2019
WO     2021/075563 A1     4/2021

OTHER PUBLICATIONS

Mizuto Aoto, "Bei Meimondai Tobikyu no Nokagakusha ni Manabu Shuchu no Takamekata (A Method of Improving Focus Recommended by a Neuroscientist Who Was a Grade-Skipping Student in a Famous University in the United States)", <URL:https://toyokeizai.net/articles/-/425084?page=3>, May 10, 2021, with a partial English translation.

(Continued)

*Primary Examiner* — Daniel Previl
(74) *Attorney, Agent, or Firm* — GREENBLUM & BERNSTEIN, P.L.C.

(57) ABSTRACT

An awakening support apparatus for prompting a user inside a vehicle to awake by prompting the user to focus. The awakening support apparatus includes a first selector that selects one category from among a plurality of categories associated with groups of presentation content items, the groups being mutually different in type of focus mode in which the user is prompted to focus, a second selector that selects one or more presentation content items from among a group of presentation content items associated with the one category, and a controller that presents the one or more presentation content items to the user.

18 Claims, 8 Drawing Sheets

(51) Int. Cl.
  *G06V 20/59* (2022.01)
  *G08G 1/0967* (2006.01)

(58) Field of Classification Search
  CPC ..... G07F 1/00; G07F 5/00; G07F 7/00; G07F 9/00; G07F 11/00; G07F 13/00; G07F 15/00; G07F 17/00; G07F 19/00; H04N 21/4394; H04N 21/4398; H04N 21/44016; H04N 21/4524; H04N 21/4662; H04N 21/64322; H04N 21/812; H04N 21/8456; H04N 21/85406; H04N 21/4126; H04N 21/44222; H04N 21/4532; H04N 21/4661; H04N 21/4667; H04N 1/00; H04N 3/00; H04N 5/00; H04N 7/00; H04N 9/00; H04N 11/00; H04N 13/00; H04N 17/00; H04N 19/00; H04N 21/00; H04N 23/00; H04N 25/00; H04N 2101/00; H04N 2201/00; H04N 2209/00; H04N 2213/00; H04N 21/44226; H04N 21/4668; H04N 21/4756; H04N 21/4826; G06F 16/435; G06F 3/016; G06F 3/013; G06F 16/9538; G06F 16/9577; G06F 3/015; G06F 3/0346; G06F 3/1446; G06F 3/1454; G06F 3/165; G06F 1/00; G06F 3/00; G06F 5/00; G06F 7/00; G06F 8/00; G06F 9/00; G06F 11/00; G06F 12/00; G06F 13/00; G06F 15/00; G06F 16/00; G06F 17/00; G06F 18/00; G06F 21/00; G06F 30/00; G06F 40/00; G06F 2111/00; G06F 2101/00; G06F 2113/00; G06F 2115/00; G06F 16/9535; G06F 16/24578; G06F 16/248; G06F 16/313; G06F 16/9536; G06F 16/958; G06F 11/1471; G06F 11/3608; G06F 8/33; G06F 8/70; G06F 8/73; G06F 9/453; G06F 16/24539; G06F 16/28; G06F 16/283; G06F 16/40; G06F 16/438; G06F 16/95; G06F 16/951; G06F 3/04815; G06F 3/0482; G06F 3/0485; G06F 3/04883; G06F 40/10; G06F 40/103; A61B 5/16; A61B 5/18; A61B 1/00; A61B 3/00; A61B 5/00; A61B 6/00; A61B 7/00; A61B 8/00; A61B 9/00; A61B 10/00; A61B 13/00; A61B 16/00; A61M 21/00; A61M 1/00; A61M 3/00; A61M 5/00; A61M 9/00; A61M 11/00; A61M 13/00; B60Q 9/00; B60Q 1/00; B60Q 3/00; B60Q 5/00; B60Q 7/00; G06Q 30/0201; G06Q 30/0251; G06Q 30/0282; G06Q 10/00; G06Q 20/00; G06Q 30/00; G06Q 40/00; G06Q 50/00; G06Q 10/40; G06Q 10/46; G06Q 30/0202; G06Q 10/083; G06Q 20/12; G06Q 30/0609; G06Q 30/0613; G06Q 30/0633; G06Q 30/0641; G06Q 30/0643; G06T 3/20; G06T 19/003; G06V 20/597; G06V 10/00; G06V 20/00; G06V 30/00; G06V 40/00; G06V 2201/00; G08G 1/0967; G08G 1/16; G08G 1/00; G08G 3/00; G08G 5/00; G08G 7/00; G08G 9/00; G08G 99/00; G09B 5/00; G09B 5/06; G09B 5/062; G09G 2320/0613; G09G 2340/04; G09G 2340/14; G09G 2354/00; G09G 2360/144; G09G 2370/06; G09G 2370/20; G09G 5/12; G09G 5/14; G06N 7/01; G06N 20/00; G06K 7/1413; G11B 27/034; G11B 27/105; G11B 27/322; G11B 3/00; G11B 5/00; G11B 7/00; G11B 9/00; G11B 11/00; G11B 13/00; G11B 15/00; G11B 17/00; G11B 19/00; G11B 20/00; G11B 21/00; G11B 23/00; G11B 25/00; G11B 27/00; G11B 31/00; G11B 33/00; G11B 2209/00; G11B 2220/00; G16H 10/40; G16H 40/63; G16H 10/00; G16H 15/00; G16H 20/00; G16H 30/00; G16H 40/00; G16H 50/00; G16H 70/00; G16H 80/00; Y10S 707/99943; Y10S 707/99945; Y10S 707/99948; Y10S 2/00; Y10S 4/00; Y10S 5/00; Y10S 8/00; Y10S 7/00; Y10S 12/00; Y10S 15/00; Y10S 16/00; Y10S 24/00; Y10S 26/00; Y10S 27/00; Y10S 29/00; Y10S 30/00; Y10S 33/00; Y10S 34/00; Y10S 36/00; Y10S 37/00; Y10S 38/00
  USPC ....... 340/439, 575, 438, 441, 449, 457, 452, 340/465, 467, 471, 517, 525, 538.14, 340/539.18, 539.22
  See application file for complete search history.

(56) References Cited

U.S. PATENT DOCUMENTS

| | | | | |
|---|---|---|---|---|
| 2008/0058052 A1* | 3/2008 | Schwartz | G07F 17/32 | |
| | | | 463/16 | |
| 2014/0168277 A1* | 6/2014 | Ashley | G06F 3/1446 | |
| | | | 345/672 | |
| 2017/0080856 A1* | 3/2017 | Enomoto | G08B 21/06 | |
| 2020/0156440 A1* | 5/2020 | Matsuoka | G06V 20/597 | |
| 2021/0284202 A1* | 9/2021 | Furumoto | B60W 60/0053 | |
| 2021/0300404 A1* | 9/2021 | Bruckmeier | B60W 50/16 | |
| 2021/0337265 A1* | 10/2021 | Carney Landow | | |
| | | | H04N 21/64322 | |
| 2022/0210510 A1* | 6/2022 | Richter | H04N 21/4126 | |
| 2022/0234594 A1* | 7/2022 | Shimizu | G08B 25/04 | |
| 2022/0292948 A1* | 9/2022 | Kotani | A61B 5/18 | |

OTHER PUBLICATIONS

International Search Report Issued in International Patent Application No. PCT/JP2023/003522, dated Mar. 7, 2023, with an English translation thereof.
Notice of Reasons for Refusal for Japanese Patent App. No. 2022-055203, dated Nov. 12, 2024, along with an English translation thereof.

* cited by examiner

FIG. 3

| Event on which user is to be focused / Time | Specific | Unspecific |
|---|---|---|
| Present | First focus | Third focus |
| Past or future | Second focus | Fourth focus |

FIG. 4

| Time | | Presentation content item |
|------|------|---------------------------|
| Past or future | | XX minute(s) before, XX minute(s) later |
| | | Before or after specific operation |
| | | So far today, yesterday, tomorrow |
| | | Next intersection or the like (distant by more than predetermined distance) |
| | | XX m ahead (distant by more than predetermined distance) |
| Present | | present, now |
| | | Next intersection or the like (within predetermined distance) |
| | | XX m ahead (within predetermined distance) |

FIG. 5

| Genre | Specific/unspecific | Presentation content item |
|---|---|---|
| Speed | Specific | Speed limit or legal speed limit |
| | Unspecific | Safe speed or appropriate speed |
| Traffic sign/ road marking | Specific | Traffic sign such as no-entry sign |
| | Unspecific | Closest traffic sign located ahead |
| Following distance | Specific | XX m |
| | Unspecific | Safe following distance, appropriate following distance |
| Something that is present other than own vehicle | Specific | Specific pedestrian, vehicle, or the like |
| | Unspecific | Unspecific pedestrian, vehicle, or the like |
| Path (road, intersection) | Specific | Specific road, intersection, or the like |
| | Unspecific | Unspecific road, intersection, or the like |

FIG. 6

| Category | Presentation content item |
|---|---|
| First category | Instruction for guiding to a legal speed limit or the like |
| | Instruction for guiding to a specific following distance to a vehicle ahead |
| | ... |
| Second category | Question related to an intersection at which the user has turned most recently |
| | Question related to a road through which the user has passed most recently |
| | ... |
| Third category | Question asking the biggest building within the current user's view |
| | Question asking the number of vehicles within the current user's view |
| | ... |
| Fourth category | Question for causing the user to look back on today's driving |
| | Question for causing the user to look back on the user's recent work or study |
| | ... |

AWAKENING SUPPORT APPARATUS AND AWAKENING SUPPORT METHOD

CROSS REFERENCE TO RELATED APPLICATION

This is a continuation application of PCT International Application No. PCT/JP2023/003522 filed on Feb. 3, 2023, designating the United States of America, which is based on and claims priority of Japanese Patent Application No. 2022-055203 filed on Mar. 30, 2022.

FIELD

The present disclosure relates to an awakening support apparatus and an awakening support method.

BACKGROUND

Conventionally, there is an apparatus that prompts a user, such as a driver of a vehicle, to awake (for example, see PTL 1). An alertness maintenance apparatus disclosed in Patent Literature (PTL) 1 includes a stimulation controller that is configured to cause an air-conditioning apparatus to generate multiple types of temperature stimuli such as a temperature stimulus to a face of a driver, a temperature stimulus to a torso of the driver from a seat on which the driver sits, and a temperature stimulus to a hand of the driver.

CITATION LIST

Patent Literature

PTL 1: Japanese Unexamined Patent Application Publication No. 2019-029000

Non Patent Literature

NPL 1: Mizuto Aoto, "A Method of Improving Focus Recommended by a Neuroscientist Who Was a Grade-Skipping Student in a Famous University in the United States", Internet (URL; https://toyokeizai.net/articles/-/425084?page=3)

SUMMARY

When a user has been repeatedly prompted to awake by being given the same stimulus again and again, the user gets used to the stimulus and becomes less easily awakened.

Therefore, the present disclosure provides an awakening support apparatus and the like that can prevent a user from becoming less easily awakened.

An awakening support apparatus according to an aspect of the present disclosure is an awakening support apparatus for prompting a user inside a vehicle to awake by prompting the user to focus. The awakening support apparatus includes a first selector that selects one category from among a plurality of categories associated with groups of presentation content items, the groups being mutually different in type of focus mode in which the user is prompted to focus, a second selector that selects one or more presentation content items from among a group of presentation content items associated with the one category, and a controller that presents the one or more presentation content items to the user.

Moreover, an awakening support method according to an aspect of the present disclosure is an awakening support method for prompting a user inside a vehicle to awake by prompting the user to focus. The awakening support method includes selecting one category from among a plurality of categories associated with groups of presentation content items, the groups being mutually different in type of focus mode in which the user is prompted to focus, selecting one or more presentation content items from among a group of presentation content items associated with the one category, and presenting the one or more presentation content items to the user.

With the awakening support apparatus and the like according to an aspect of the present disclosure, it is possible to prevent a user from becoming less easily awakened.

BRIEF DESCRIPTION OF DRAWINGS

These and other advantages and features of the present disclosure will become apparent from the following description thereof taken in conjunction with the accompanying drawings that illustrate a specific embodiment of the present disclosure.

FIG. 3 is a diagram for explaining a specific example of a plurality of types of focus modes in which a user is prompted to focus.

FIG. 4 is a diagram illustrating a specific example of presentation content items that are presented to the user.

FIG. 5 is a diagram illustrating a specific example of presentation content items that are presented to the user.

FIG. 6 is a diagram illustrating a specific example of presentation content items that are presented to the user.

DESCRIPTION OF EMBODIMENT

Outline of the Present Disclosure

Figure 1:
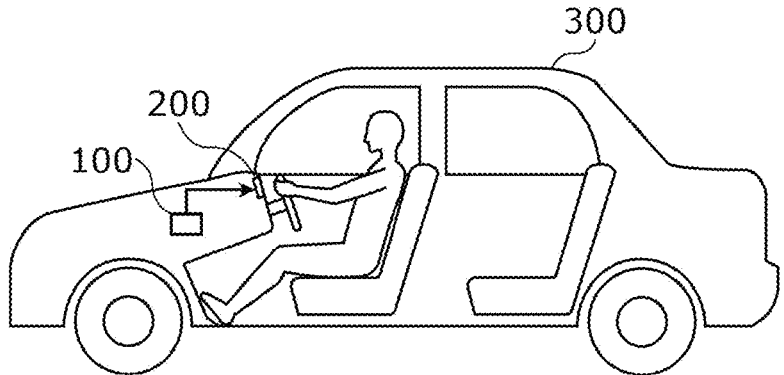
FIG. 1 is a diagram schematically illustrating the inside of a vehicle where an awakening support apparatus according to an embodiment is used.

An awakening support apparatus according to an aspect of the present disclosure is an awakening support apparatus for prompting a user inside a vehicle to awake by prompting the user to focus. The awakening support apparatus includes a first selector that selects one category from among a plurality of categories associated with groups of presentation content items, the groups being mutually different in type of focus mode in which the user is prompted to focus, a second selector that selects one or more presentation content items from among a group of presentation content items associated with the one category, and a controller that presents the one or more presentation content items to the user.

According to this aspect, the user is prompted to awake by being prompted to focus by a presentation content item appropriately selected by the awakening support apparatus from among a group of presentation content items out of groups of presentation content items that are mutually different in type of focus mode in which the user is prompted to focus. Therefore, the awakening support apparatus can prompt the user to awake by prompting the user to focus while preventing the user from getting used to a presentation content item presented to the user by changing the presentation content item at an appropriate timing. Accordingly, the awakening support apparatus according to an aspect of the present disclosure can prevent the user from becoming less easily awakened.

Moreover, for example, each presentation item of the groups of presentation content items is a question for the user or an instruction for causing the user to perform a predetermined operation.

Furthermore, for example, the plurality of categories include a category associated with, among the groups of presentation content items, a group of presentation content items each of which is related to a different situation in present and a category associated with, among the groups of presentation content items, a group of presentation content items each of which is related to a different situation in past or future.

Furthermore, for example, the plurality of categories include a category associated with, among the groups of presentation content items, a group of presentation content items each of which is related to a different specific situation and a category associated with, among the groups of presentation content items, a group of presentation content items each of which is related to a different unspecific situation.

Furthermore, for example, the plurality of categories include (i) a category associated with, among the groups of presentation content items, a group of presentation content items each of which is related to a different specific situation in present, (ii) a category associated with, among the groups of presentation content items, a group of presentation content items each of which is related to a different specific situation in past or future, (iii) a category associated with, among the groups of presentation content items, a group of presentation content items each of which is related to a different unspecific situation in the present, and (iv) a category associated with, among the groups of presentation content items, a group of presentation content items each of which is related to a different unspecific situation in the past or future.

According to these aspects, groups of presentation content items that are mutually different in type of focus mode in which the user is prompted to focus can be realized.

Moreover, for example, the awakening support apparatus further includes a sleepiness estimator that estimates a sleepiness level indicating a degree of sleepiness of the user, based on state information indicating a result of detection performed by a state sensor that detects a state of the user, and the first selector selects the one category according to the sleepiness level estimated by the sleepiness estimator.

According to this aspect, the awakening support apparatus can select or change the one category according to the sleepiness level of the user.

Moreover, for example, when the sleepiness level estimated by the sleepiness estimator is greater than or equal to a first sleepiness threshold value, the controller presents the one or more presentation content items to the user.

According to this aspect, the awakening support apparatus can present the one or more presentation content items when the user becomes sleepy.

Moreover, for example, when the sleepiness level estimated by the sleepiness estimator is greater than or equal to a second sleepiness threshold value that is higher than the first sleepiness threshold value, the first selector changes the one category to an other category that is other than the one category among the plurality of categories, and the second selector selects one or more presentation content items from among a group of presentation content items associated with the other category.

According to this aspect, when the user becomes less easily prompted to focus because the user got used to a presentation content item presented to the user, the awakening support apparatus can change the presentation content item.

Moreover, for example, each time a predetermined time elapses, the first selector changes the one category to an other category that is other than the one category among the plurality of categories, and the second selector selects one or more presentation content items from among a group of presentation content items associated with the other category.

According to this aspect, since a presentation content item presented to the user is periodically changed, the awakening support apparatus with a simple configuration can prevent the user from becoming less easily awakened.

Moreover, for example, each time presentation of any presentation content item among the group of presentation content items associated with the one category is performed a predetermined number of times, the first selector changes the one category to an other category that is other than the one category among the plurality of categories, and the second selector selects one or more presentation content items from among a group of presentation content items associated with the other category.

Furthermore, for example, the first selector selects the one category based on a predetermined order of the plurality of categories.

Furthermore, for example, the first selector randomly selects the one category from among the plurality of categories.

According to these aspects, since repeat presentation of the same presentation content item to the user is prevented, the awakening support apparatus with a simple configuration can prevent the user from becoming less easily awakened.

Moreover, for example, the first selector selects the one category based on environment information indicating a result of detection performed by a surrounding environment sensor that detects an environment surrounding the vehicle.

According to this aspect, the awakening support apparatus can appropriately select a presentation content item according to a place where the vehicle is located or a traffic condition in the place where the vehicle is located.

Moreover, for example, the environment information indicates a traffic volume around the vehicle, and when the traffic volume indicated by the environment information is greater than or equal to a predetermined amount, the first selector selects, as the one category, a category associated with, among the groups of presentation content items, a group of presentation content items each of which is related to a different specific situation in present.

For example, when the user is a driver of the vehicle, it is considered that driving operation such as steering, accelerating, braking, etc. by the user is more frequently performed in a place where the traffic volume is heavy, as compared to a place where the traffic volume is light. In such a case, the awakening support apparatus takes into consideration the safety of driving and presents a presentation content item related to a specific situation in the present (e.g., in driving), for example, a presentation content item related to driving, such as a traveling state of another vehicle near the vehicle driven by the user or a lighting state of a traffic light. Accordingly, the awakening support apparatus can prompt the user to awake without interrupting driving by the user.

Moreover, for example, the controller presents, to the user, any presentation content item among the group of presentation content items associated with the one category at a predetermined time interval.

According to this aspect, since presentation of a presentation content item to the user is periodically performed, the awakening support apparatus with a simple configuration can prevent an occurrence of a state in which the user is not awakened (i.e., the user is sleepy).

Moreover, for example, the predetermined time interval is set based on environment information indicating a result of detection performed by a surrounding environment sensor that detects an environment surrounding the vehicle.

As described above, when the user is a driver of the vehicle for example, it is considered that driving operation such as steering, accelerating, braking, etc. by the user is more frequently performed in a place where the traffic volume is heavy, as compared to a place where the traffic volume is light. Therefore, it is considered that the user is more frequently prompted to awake by the driving operation in a place where the traffic volume is heavy, as compared to a place where the traffic volume is light. Accordingly, it is considered that even when the frequency of presentation of a presentation content item to the user is low, a state in which the user is awakened is more likely to be maintained in a place where the traffic volume is heavy, as compared to a place where the traffic volume is light. Then, since the predetermined time interval is set based on the environment information, the awakening support apparatus can present a presentation content item to the user at an appropriate frequency for prompting the user to awake by prompting the user to focus.

Moreover, for example, the awakening support apparatus further includes a sleepiness estimator that estimates a sleepiness level indicating a degree of sleepiness of the user, based on state information indicating a result of detection performed by a state sensor that detects a state of the user, and the predetermined time interval is set based on the sleepiness level estimated by the sleepiness estimator.

According to this aspect, the awakening support apparatus can present a presentation content item appropriately at a frequency according to the sleepiness level of a user.

Moreover, for example, the controller controls a presentation apparatus to present the one or more presentation content items to the user by at least one of sound or an image.

According to this aspect, the awakening support apparatus can present a presentation content item to the user by a device such as a display or a loudspeaker.

Moreover, an awakening support method according to an aspect of the present disclosure is an awakening support method for prompting a user inside a vehicle to awake by prompting the user to focus. The awakening support method includes selecting one category from among a plurality of categories associated with groups of presentation content items, the groups being mutually different in type of focus mode in which the user is prompted to focus, selecting one or more presentation content items from among a group of presentation content items associated with the one category, and presenting the one or more presentation content items to the user.

According to this aspect, the awakening support method exhibits the same effect as the awakening support apparatus according to an aspect of the present disclosure.

It should be noted that these general or specific aspects may be realized as a system, a method, an integrated circuit, a computer program, a non-transitory computer readable recording medium such as a CD-ROM, or any given combination thereof.

For example, an aspect of the present disclosure can be realized as a program for causing a computer to execute the above-described awakening support method. Moreover, an aspect of the present disclosure can be realized as a non-transitory computer readable recording medium in which the program is stored.

Hereinafter, an embodiment will be described in detail with reference to the Drawings.

It should be noted that each embodiment described below shows a general or specific example. The numerical values, shapes, materials, constituent elements, the arrangement and connection of the constituent elements, steps, the processing order of the steps etc. shown in the embodiment below are mere examples, and therefore do not intend to limit the scope of the present disclosure. Moreover, among the constituent elements in the embodiment below, constituent elements not recited in any one of the independent claims are described as arbitrary constituent elements.

Furthermore, the respective figures are schematic diagrams and are not necessarily precise illustrations. Accordingly, for example, the scaling, etc., depicted in the drawings is not necessarily accurate. Moreover, in the respective figures, elements having substantially the same configuration are given the same reference sign, and overlapping explanations thereof are omitted or simplified.

Furthermore, although the description below may include a phrase such as "greater than or equal to a threshold value", such a phrase is not intended to mean the strict meaning of the words. For example, the phrase "greater than or equal to a threshold value" may mean being greater than the threshold value. Moreover, when the phrase "greater than or equal to a threshold value" and the phrase "less than the threshold value" are stated in contrast to each other, it is meant that the threshold value is a borderline and these phrases may mean "greater than the threshold value" and "less than or equal to the threshold value", respectively.

EMBODIMENT

Outline

First, a configuration of an awakening support apparatus according to an embodiment is described.

FIG. 1 is a diagram schematically illustrating the inside of vehicle 300 where awakening support apparatus 100 according to the embodiment is used.

Awakening support apparatus 100 is a control apparatus that prompts a user inside vehicle 300 to awake by prompting the user to focus.

Vehicle 300 is, for example, an automobile, and the user is, for example, a driver of vehicle 300.

Awakening support apparatus 100 presents a predetermined presentation content item to the user by controlling presentation apparatus 200. The presentation content item is a question for the user or an instruction for causing the user to perform a predetermined operation. In other words, awakening support apparatus 100 prompts the user to focus by asking a question or giving an instruction to the user.

Awakening support apparatus 100 is, for example, realized as a computer apparatus. Specifically, awakening support apparatus 100 is realized as nonvolatile memory in which a program is stored, volatile memory that is a temporary storage area for executing the program, an input/ output port, a communication interface, a processor that executes the program, and the like.

It should be noted that the user may be a person other than the driver inside vehicle 300, such as a person sitting on a passenger seat or a person sitting on a back seat.

Moreover, vehicle 300 may be an automobile or an arbitrary vehicle such as a motorcycle.

Figure 2:
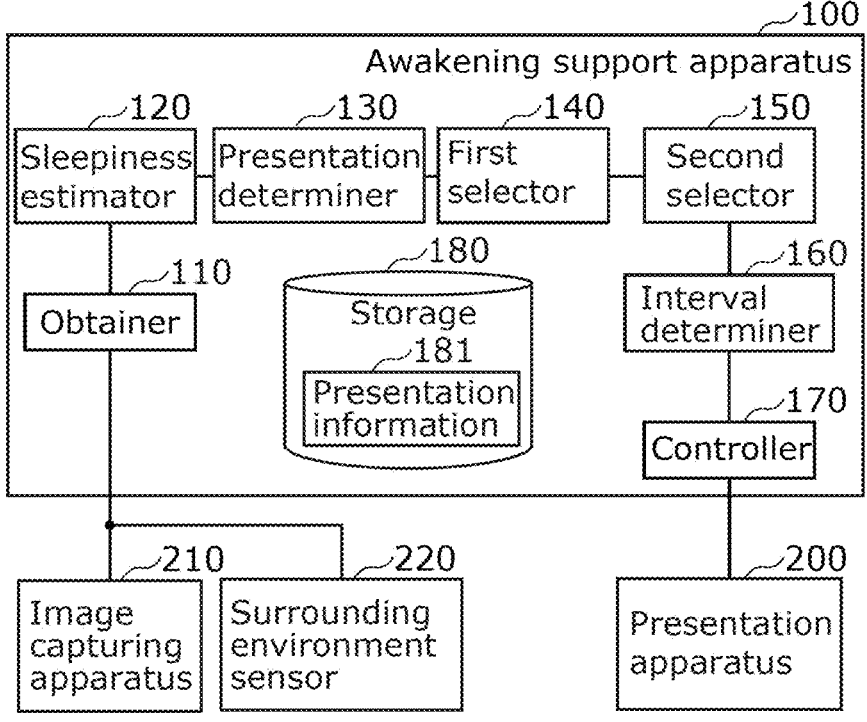
FIG. 2 is a block diagram illustrating a functional configuration of the awakening support apparatus according to the embodiment.

FIG. 2 is a block diagram illustrating a functional configuration of awakening support apparatus 100 according to the embodiment.

Awakening support apparatus 100 includes obtainer 110, sleepiness estimator 120, presentation determiner 130, first selector 140, second selector 150, interval determiner 160, controller 170, and storage 180.

Obtainer 110 obtains, from image capturing apparatus 210, state information indicating a result of image capturing performed by image capturing apparatus 210, and obtains, from surrounding environment sensor 220, state information indicating a result of detection performed by surrounding environment sensor 220.

It should be noted that image capturing apparatus 210 is an example of a state sensor.

Obtainer 110 is, for example, realized as a communication interface that communicates with image capturing apparatus 210 and surrounding environment sensor 220. Obtainer 110 may be realized as a connector or the like to which a communication line is connected, or as an antenna and a wireless communication circuit for wirelessly communicating with image capturing apparatus 210 and surrounding environment sensor 220.

Sleepiness estimator 120 is a processing unit that estimates (calculates) a sleepiness level that indicates the degree of sleepiness of the user, based on state information indicating a result of detection performed by a state sensor that detects the state of the user.

The state information is, for example, an image of the user (more specifically, image data in which the user is shown). For example, sleepiness estimator 120 estimates the sleepiness level of the user, based on an image in which the user is shown captured by image capturing apparatus 210 connected to sleepiness estimator 120. In the present embodiment, sleepiness estimator 120 estimates the sleepiness level of the user, based on an eye blink of the user shown in a moving image obtained from image capturing apparatus 210. For example, sleepiness estimator 120 uses, for an estimation of a sleepiness level, the length of time of an eye blink, the number of eye blinks in a predetermined time period, and/or the degree of an eye blink (degree of opening of an eye). For example, when a cycle of an eye blink of the user is constant, sleepiness estimator 120 estimates that the user is not sleepy, and estimates that the sleepiness level of the user is low, for example, 1. In contrast, for example, when an eye blink of the user is slow or a cycle of an eye blink of the user is short and frequent, sleepiness estimator 120 estimates that the user is sleepy, and estimates that the sleepiness level of the user is high, for example, 10. Namely, it is estimated that the user is not sleepy when a cycle of an eye blink of the user is constant, and it is estimated that the user is sleepy when an eye blink of the user is slow and frequent.

Alternatively, for example, when the length of time of an eye blink of the user is long, i.e., when the user is dozing off, sleepiness estimator 120 estimates that the sleepiness level of the user is high, and when the length of time of an eye blink is short, sleepiness estimator 120 estimates that the sleepiness level of the user is low.

Alternatively, for example, when the degree of an eye blink (degree of opening of an eye) of the user is small, sleepiness estimator 120 estimates that the sleepiness level of the user is high, and when the degree of an eye blink of the user is large, sleepiness estimator 120 estimates that the sleepiness level of the user is low.

Alternatively, sleepiness estimator 120 may estimate the sleepiness level of the user by using a combination of a plurality of indicators related to an eye blink, such as the length of time of an eye blink, the frequency of an eye blink, and the degree of opening of an eye.

Thus, sleepiness estimator 120 estimates the sleepiness level of the user by analyzing a moving image in which the user is shown obtained from image capturing apparatus 210.

It should be noted that a reference value of a cycle of an eye blink or the like used by sleepiness estimator 120 for estimating the sleepiness level of the user may be arbitrarily determined in advance.

Moreover, the sleepiness level is an indicator that indicates the degree of sleepiness of the user, as described above. For example, the sleepiness level is represented as a numerical value within a predetermined range such as a range from 0 to 1, a range from 0 to 10, or a range from 0 to 100 (in units of 0.1 or 1). Moreover, in the present embodiment, a higher sleepiness level represents that the user is more sleepy, and a lower sleepiness level represents that the user is less sleepy, i.e., the user is more awake. Of course, the relationship between sleepiness level and state of sleepiness of the user may be opposite to the above-described relationship.

It should be noted that a numerical value range of the sleepiness level is not particularly limited and may be arbitrarily set.

Presentation determiner 130 is a processing unit that determines whether to perform presentation to the user. For example, when presentation determiner 130 determines that the sleepiness level estimated by sleepiness estimator 120 is greater than or equal to a first sleepiness threshold value, presentation determiner 130 determines to cause controller 170 to present, to the user, one or more presentation content items selected by first selector 140 and second selector 150. In contrast, for example, when presentation determiner 130 determines that the sleepiness level estimated by sleepiness estimator 120 is less than the first sleepiness threshold value, presentation determiner 130 determines not to perform presentation to the user.

Moreover, for example, presentation determiner 130 determines whether to change a presentation content item currently presented to the user. For example, when the sleepiness level estimated by sleepiness estimator 120 is greater than or equal to a second sleepiness threshold value that is higher than the first sleepiness threshold value, presentation determiner 130 determines to change a presentation content item currently presented to the user.

It should be noted that the first sleepiness threshold value and the second sleepiness threshold value are not particularly limited and may be arbitrarily set.

First selector 140 is a processing unit that selects one category from among a plurality of categories associated with groups of presentation content items. The groups are mutually different in type of focus mode in which the user is prompted to focus. For example, first selector 140 selects one category from among a plurality of categories included in presentation information 181 stored in storage 180.

There are a plurality of types of human focus modes (also simply referred to as focus). A plurality of types of focus modes in which the user is prompted to focus are different depending on the presentation content item to be presented to the user.

FIG. 3 is a diagram for explaining a specific example of a plurality of types of focus modes in which the user is prompted to focus.

The plurality of types of focus modes include, for example, first focus, second focus, third focus, and fourth focus.

For example, a presentation content item related to a specific situation in the present is presented to the user to thereby prompt the user to focus in the first focus. The presentation content item in the case where the user is prompted to focus in the first focus is exemplified by an instruction for guiding the user driving vehicle 300 to adjust the current following distance to 50 m, a question about the current legal speed limit, and the like.

Moreover, for example, a presentation content item related to a specific situation (event) in the past or future is presented to the user to thereby prompt the user to focus in the second focus. The presentation content item in the case where the user is prompted to focus in the second focus is exemplified by a question about an intersection at which the user driving vehicle 300 has turned before turning at the last intersection, a question about a road through which the user is going to pass next, a question about the name of an elementary school the user attended, a question about the user's schedule for tomorrow, and the like.

Moreover, for example, a presentation content item related to an unspecific situation in the present is presented to the user to thereby prompt the user to focus in the third focus. The presentation content item in the case where the user is prompted to focus in the third focus is exemplified by an instruction for guiding the user driving vehicle 300 to adjust the current following distance to a safe distance, a question for causing the user to search for the biggest vehicle among vehicles within the current user's view, and the like.

Moreover, for example, a presentation content item related to an unspecific situation in the past or future is presented to the user to thereby prompt the user to focus in the fourth focus. The presentation content item in the case where the user is prompted to focus in the fourth focus is exemplified by a question for causing the user to recall an intersection at which a red traffic light was on among intersections through which the user driving vehicle 300 has passed so far today, a question such as "What do you want to do tomorrow?", or the like.

As described above, since various presentation content items that are different in type of object on which the user is caused to focus are presented to the user, the user is prompted to focus in various types of focus modes.

The plurality of categories are associated with groups of presentation content items that are mutually different in type of focus mode in which the user is prompted to focus, as the above-described focus modes.

For example, the plurality of categories include a category associated with a group of presentation content items each of which is related to a different situation in the present and a category associated with a group of presentation content items each of which is related to a different situation in the past or future. Moreover, for example, the plurality of categories include a category associated with a group of presentation content items each of which is related to a different specific situation and a category associated with a group of presentation content items each of which is related to a different unspecific situation.

Accordingly, groups of presentation content items that are mutually different in type of focus mode in which the user is prompted to focus may be realized.

It should be noted that, for example, the present is a time period including a time point at which a presentation content item is presented and immediately after the time point, and the past or future is a time period other than the present. For example, a time period regarded as the present is several seconds or several tens of seconds from a time point at which a presentation content item is presented to the user. Moreover, for example, a situation in the present may be a situation in a place that is on an extension of a road on which vehicle 300 is traveling within a predetermined distance from the location of vehicle 300 (i.e., location of the user) at a time point at which a presentation content item is presented to the user, such as a next intersection located in the traveling direction of vehicle 300 on the road on which vehicle 300 is traveling. The predetermined distance is, for example, an arbitrarily set distance or a distance in which a traffic sign is readable, such as several meters. Similarly, a situation in the past or future may be a situation in a place that is farther than the predetermined distance from the current location of vehicle 300, such as a place several km ahead of the current location of vehicle 300.

Moreover, a specific situation is, for example, an event regarding which an intuitive instruction, such as an instruction like "Adjust the following distance to XX m.", or an intuitive question, such as a question like "What is the name of an elementary school you attended?", can be made. In other words, a specific situation is an event regarding which an instruction instructing an already specified thing, such as "XX m", or a question asking an already specified thing, such as "an elementary school you attended", can be made. In contrast, an unspecific situation is, for example, an event regarding which a nonintuitive instruction, such as an instruction like "Adjust the following distance to a safe distance.", or a nonintuitive question, such as a question like "How many intersections at which a red traffic light was on have you turned so far today?", can be made. In other words, an unspecific situation is an event regarding which an instruction requiring the user to think, such as an instruction instructing "a safe distance", or a question requiring the user to search for an answer, such as a question asking "how many", can be made.

Moreover, for example, the plurality of categories may include a category associated with a group of presentation content items made by arbitrarily combining these events. Specifically, for example, the plurality of categories include (i) a category associated with a group of presentation content items each of which is related to a different specific situation in the present, (ii) a category associated with a group of presentation content items each of which is related to a different specific situation in the past or future, (iii) a category associated with a group of presentation content items each of which is related to a different unspecific situation in the present, and (iv) a category associated with a group of presentation content items each of which is related to a different unspecific situation in the past or future.

In the present embodiment, a first category is associated with a group of presentation content items for prompting the user to focus in the first focus. Moreover, in the present embodiment, a second category is associated with a group of presentation content items for prompting the user to focus in the second focus. Furthermore, in the present embodiment, a third category is associated with a group of presentation content items for prompting the user to focus in the third focus. Furthermore, in the present embodiment, a fourth category is associated with a group of presentation content items for prompting the user to focus in the fourth focus.

Accordingly, groups of presentation content items that are mutually different in type of focus mode in which the user is prompted to focus may be realized.

For example, each presentation item of the groups of presentation content items is a question for the user or an instruction for causing the user to perform a predetermined operation.

It should be noted that the way how first selector 140 selects one category may be arbitrarily determined.

For example, first selector 140 selects one category according to the sleepiness level of the user estimated by sleepiness estimator 120. For example, first selector 140 may newly select a category or change the category currently selected to an other category, according to the sleepiness level.

Accordingly, awakening support apparatus 100 can select or change a category according to the sleepiness level of the user.

Alternatively, for example, first selector 140 selects one category based on a predetermined order of the plurality of categories.

It should be noted that the predetermined order may be arbitrarily determined.

Alternatively, for example, first selector 140 randomly selects one category from among the plurality of categories.

Thus, since repeat presentation of the same presentation content item to the user is prevented, awakening support apparatus 100 with a simple configuration can prevent the user from becoming less easily awakened.

For example, first selector 140 may alternately select the first category and the fourth category each time category change is performed. Alternatively, for example, first selector 140 may alternately select the second category and the third category each time category change is performed. Alternatively, for example, first selector 140 may alternately select the first category and the third category each time category change is performed. Alternatively, for example, first selector 140 may alternately select the second category and the fourth category each time category change is performed. Alternatively, for example, first selector 140 may alternately select the first category and the second category each time category change is performed. Alternatively, for example, first selector 140 may alternately select the third category and the fourth category each time category change is performed. Alternatively, for example, first selector 140 may generate a random number and select one category based on the random number generated.

Alternatively, for example, first selector 140 selects one category based on environment information indicating a result of detection performed by surrounding environment sensor 220 that detects the environment surrounding vehicle 300.

The environment information is, for example, information indicating a place where vehicle 300 is located, a traffic condition in the place where vehicle 300 is located, the weather or temperature around vehicle 300, or the like.

Accordingly, a presentation content item corresponding to the place where vehicle 300 is located, the traffic condition in the place where vehicle 300 is located, or the like may be appropriately selected.

For example, when the environment information indicates the traffic volume around vehicle 300 and the traffic volume indicated by the environment information is greater than or equal to a predetermined amount, first selector 140 may select one category (the first category in the present embodiment) associated with a group of presentation content items each of which is related to a different specific situation in the present, from among the plurality of categories.

For example, it is considered that when the user is a driver of vehicle 300, driving operation such as steering, accelerating, braking, etc. is more frequently performed in a place where the traffic volume is heavy, as compared to a place where the traffic volume is light. In such a case, awakening support apparatus 100 takes into consideration the safety of driving and presents a presentation content item related to a specific situation (e.g., a traveling state of another vehicle near vehicle 300 driven by the user, or a lighting state of a traffic light) in the present (e.g., in driving), such as a presentation content item related to driving, for example, a presentation content item related to a traveling state of another vehicle near vehicle 300 driven by the user or a lighting state of a traffic light. Thus, awakening support apparatus 100 can prompt a user to awake without interrupting driving by the user.

It should be noted that the predetermined amount may be arbitrarily determined.

Moreover, first selector 140 may change one category currently selected to an other category, according to the sleepiness level of the user, environment information, and/or an elapsed time from a timing at which a presentation content item currently selected is presented.

Moreover, awakening support apparatus 100 may include a clock, such as a real time clock (RTC), for measuring time.

Second selector 150 is a processing unit that selects one or more presentation content items from among a group of presentation content items associated with one category selected by first selector 140. Second selector 150 selects, for example, one or more presentation content items from among groups of presentation content items associated with a plurality of categories included in presentation information 181.

It should be noted that second selector 150 may select one presentation content item or two or more presentation content items. For example, when a presentation content item to be displayed as an image and a presentation content item to be outputted as sound that are the same in content exist, second selector 150 may select either one or both of the presentation content item to be displayed as an image and the presentation content item to be outputted as sound.

Each of FIG. 4 and FIG. 5 shows a specific example of presentation content items to be presented to the user. Presentation information 181 includes, for example, information shown in FIG. 4 and FIG. 5.

A presentation content item associated with "past or future" is exemplified by a situation related to: XX minute(s) before; XX minute(s) later; before or after specific operation such as a right or left turn at the last intersection; so far today; yesterday; tomorrow; or a place that is distant by more than a predetermined distance from the location of vehicle 300, such as a next intersection or a place to be reached after turning right or left at a corner that is located XX m ahead of the location of vehicle 300.

It should be noted that presentation information 181 may include information on a map of the road on which the user is traveling.

A presentation content item associated with "present" is exemplified by a situation related to: present; now; or a place that is located within the predetermined distance from the location of vehicle 300, such as a next intersection or a place that is located XX m ahead of the location of vehicle 300.

Moreover, a presentation content item other than a presentation content item related to time is exemplified by a presentation content item whose genre is: speed; traffic sign or road marking; following distance; something that is present other than own vehicle (e.g., something that is present around vehicle 300 other than vehicle 300, such as a pedestrian, a bicycle, a blind spot, another vehicle, a shop, or a historic site); or path (for example, traveling path of vehicle 300 that is a road, an intersection, or the like). Furthermore, for example, each genre includes a presentation content item related to a specific situation and a presentation content item related to an unspecific situation.

For example, a presentation content item whose genre is speed is exemplified by a presentation content item related to a specific situation (state) such as a speed limit or a legal speed limit. For example, since a speed limit or a legal speed limit is uniquely determined depending on the road, it can be said that the speed limit or the legal speed limit is specified (i.e., is a specific situation).

Moreover, for example, a presentation content item whose genre is speed is exemplified by a presentation content item related to an unspecific situation (state) such as a safe speed or an appropriate speed. For example, since the specific speed of a safe speed or an appropriate speed is unclear, it can be said that the safe speed or the appropriate speed is not specified (i.e., is an unspecific situation).

Moreover, for example, a presentation content item whose genre is traffic sign or road marking is exemplified by a presentation content item related to a specific situation (object) such as a no-entry sign. For example, since the specific traffic sign type of a no-entry sign is clear, it can be said that the no-entry sign is specified (i.e., is a specific situation).

Moreover, for example, a presentation content item whose genre is traffic sign or road marking is exemplified by a presentation content item related to an unspecific situation (object) such as a closest traffic sign among traffic signs located ahead of vehicle 300. For example, since the specific traffic sign type of a closest traffic sign among traffic signs located ahead of vehicle 300 is unclear, it can be said that the closest traffic sign among the traffic signs located ahead of vehicle 300 is not specified (i.e., is an unspecific situation).

Moreover, for example, a presentation content item whose genre is following distance is exemplified by a presentation content item related to a specific situation (state) such as XX m. For example, since the specific distance of XX (it should be noted that XX is a specific numerical value) m that is the following distance to a vehicle ahead of vehicle 300 is clear, it can be said that XX m is specified (i.e., is a specific situation).

Moreover, for example, a presentation content item whose genre is following distance is exemplified by a presentation content item related to an unspecific situation (state) such as a safe following distance or an appropriate following distance. For example, since the specific distance of a safe following distance or an appropriate following distance as the following distance to a vehicle ahead of vehicle 300 is unclear, it can be said that the safe following distance or the appropriate following distance is not specified (i.e., is an unspecific situation).

Moreover, for example, a presentation content item whose genre is something that is present other than own vehicle is exemplified by a presentation content item related to a specific situation (object) such as a specific pedestrian or a specific vehicle, e.g., a pedestrian that is present on the right rear side of vehicle 300, a vehicle that is present ahead of vehicle 300, or the like. For example, since a pedestrian that is present on the right rear side of vehicle 300, a vehicle that is present ahead of vehicle 300, or the like is specifically clear, it can be said that the pedestrian that is present on the right rear side of vehicle 300, the vehicle that is present ahead of vehicle 300, or the like is specified (i.e., is a specific situation).

Moreover, for example, a presentation content item whose genre is something that is present other than own vehicle is exemplified by a presentation content item related to an unspecific situation (object) such as an unspecific pedestrian or an unspecific vehicle, e.g., the type of a biggest vehicle among vehicles, the name of a closest shop among shops, or the like. For example, since the type of a biggest vehicle among vehicles, the name of a closest shop among shops, or the like, is unclear and causes the user to think or search for an answer, it can be said that the type of the biggest vehicle among the vehicles, the name of the closest shop among the shops, or the like is not specified (i.e., is an unspecific situation).

Moreover, for example, a presentation content item whose genre is path is exemplified by a presentation content item related to a specific situation (object) such as a specific road or a specific intersection.

Moreover, for example, a presentation content item whose genre is path is exemplified by a presentation content item related to an unspecific situation (object) such as an unspecific road or an unspecific intersection, e.g., the number of intersections at which vehicle 300 was stopped by a red light among intersections through which vehicle 300 has passed. For example, since the number of intersections at which vehicle 300 was stopped by a red light among intersections through which vehicle 300 has passed is unclear and causes the user to think or search for an answer, it can be said that the number of the intersections at which vehicle 300 was stopped by a red light among the intersections through which vehicle 300 has passed is not specified (i.e., is an unspecific situation).

For example, when first selector 140 selects the first category, second selector 150 selects (determines) one or more presentation content items by combining a presentation content item classified as "present" in FIG. 4 and a presentation content item classified as "specific" in FIG. 5. For example, when first selector 140 selects the first category, second selector 150 selects one or more presentation content items to make an instruction like "Now, please adjust the following distance to XX m".

It should be noted that an item indicating "now" or "present" is not necessarily presented.

Moreover, for example, when first selector 140 selects the second category, second selector 150 selects one or more presentation content items by combining a presentation content item classified as "past or future" in FIG. 4 and a presentation content item classified as "specific" in FIG. 5. For example, when first selector 140 selects the second category, second selector 150 selects one or more presentation content items to make a question like "Was there any no-entry sign at an intersection at which vehicle 300 has turned before turning at the last intersection?".

Moreover, for example, when first selector 140 selects the third category, second selector 150 selects one or more presentation content items by combining a presentation content item classified as "present" in FIG. 4 and a presentation content item classified as "unspecific" in FIG. 5. For example, when first selector 140 selects the third category, second selector 150 selects one or more presentation content items to make an instruction like "Please drive at a safe speed".

Moreover, for example, when first selector 140 selects the fourth category, second selector 150 selects one or more presentation content items by combining a presentation content item classified as "past or future" in FIG. 4 and a presentation content item classified as "unspecific" in FIG. 5. For example, when first selector 140 selects the fourth category, second selector 150 selects one or more presentation content items to make a question like "How many red vehicles have you passed by so far today?".

As described above, for example, second selector 150 determines one or more presentation content items by combining a presentation content item related to time as shown in FIG. 4 and a presentation content item related to genre other than time as shown in FIG. 5.

It should be noted that a presentation content item shown in FIG. 4 and a presentation content item shown in FIG. 5 may be combined in advance and included in presentation information 181.

FIG. 6 is a diagram illustrating a specific example of presentation content items to be presented to the user.

For example, when a presentation content item shown in FIG. 6 is included in presentation information 181, second selector 150 selects one or more presentation content items from among a group of presentation content items associated with one category selected by first selector 140.

For example, a presentation content item associated with the first category is exemplified by an instruction for guiding to a legal speed limit or the like, an instruction for guiding to a specific following distance to a vehicle ahead of vehicle 300, such as XX m, or the like. Moreover, for example, a presentation content item associated with the second category is exemplified by a question related to an intersection at which vehicle 300 has turned most recently, a question related to a road through which vehicle 300 has passed most recently, or the like. Furthermore, for example, a presentation content item associated with the third category is exemplified by a question asking the biggest building within the current user's view, a question asking the number of vehicles within the current user's view, or the like. Furthermore, for example, a presentation content item associated with the fourth category is exemplified by a question for causing the user to look back on today's driving, a question for causing the user to look back on the user's recent work or study, or the like.

Furthermore, for example, when first selector 140 changes one category currently selected to an other category, second selector 150 newly selects one or more presentation content items from among a group of presentation content items associated with the other category.

For example, when presentation determiner 130 determines that the sleepiness level of the user estimated by sleepiness estimator 120 is greater than or equal to the second sleepiness threshold value that is higher than the first sleepiness threshold value, first selector 140 changes one category currently selected to an other category that is other than the one category currently selected among the plurality of categories.

Accordingly, when the user becomes less easily prompted to focus because the user got used to a presentation content item presented to the user, awakening support apparatus 100 can change the presentation content item.

Moreover, for example, each time a predetermined time elapses, first selector 140 changes one category currently selected to an other category that is other than the one category currently selected among the plurality of categories.

Accordingly, since a presentation content item presented to the user is periodically changed, awakening support apparatus 100 with a simple configuration can prevent the user from becoming less easily awakened.

It should be noted that the predetermined time may be arbitrarily set.

Moreover, for example, each time presentation of any presentation content item among a group of presentation content items associated with one category currently selected is performed a predetermined number of times while changing the presentation content item at every presentation, first selector 140 changes the one category currently selected to, among the plurality of categories, an other category that is other than the one category currently selected. For example, second selector 150 selects a first presentation content item included in the first category, and then selects a second presentation content item that is also included in the first category but different from the first presentation content item. Next, for example, first selector 140 selects the second category that is different from the first category. Next, for example, second selector 150 selects a third presentation content item included in the second category, and then selects a fourth presentation content item that is also included in the second category but different from the third presentation content item. Thus, for example, when selecting one or more presentation content items from among a group of presentation content items included in the same category is repeatedly performed, second selector 150 selects one or more presentation content items so as not to continuously select the same one or more presentation content items. For example, when selecting one or more presentation content items from among a group of presentation content items included in the same category is repeatedly performed, second selector 150 may select one or more presentation content items so as not to repeatedly select the same one or more presentation content items.

Accordingly, since repeat presentation of the same presentation content item to the user is prevented, awakening support apparatus 100 with a simple configuration can prevent the user from becoming less easily awakened.

It should be noted that the predetermined number of times may be arbitrarily set.

As described above, when first selector 140 changes one category currently selected to an other category, second selector 150 selects, for example, one or more presentation content items from among a group of presentation content items associated with the other category selected by first selector 140.

Interval determiner 160 is a processing unit that determines a predetermined time interval between timings at each of which presentation of one or more presentation content items selected by second selector 150 is performed. For example, second selector 150 repeatedly performs selecting one or more presentation content items from among a group of presentation content items associated with one category selected by first selector 140 while changing the one or more presentation content items. Presentation of one or more presentation content items selected is repeatedly performed. Interval determiner 160 determines a predetermined time interval between timings at each of which presentation of one or more presentation content items selected is performed while changing the one or more presentation content items as described above.

For example, a predetermined time interval is set (determined) based on environment information indicating a result of detection performed by a surrounding environment sensor that detects the environment surrounding vehicle 300. As described above, it is considered that driving operation such as steering, accelerating, braking, etc. by the user is more frequently performed in a place where the traffic volume is heavy, as compared to a place where the traffic volume is light. Therefore, it is considered that the user is more frequently prompted to awake by the driving operation in a place where the traffic volume is heavy, as compared to a place where the traffic volume is light. Accordingly, it is considered that even when the frequency of presentation of a presentation content item to the user is low, a state in which the user is awakened is more likely to be maintained in a place where the traffic volume is heavy, as compared to a place where the traffic volume is light. Therefore, for example, interval determiner 160 determines a predetermined time interval so that the predetermined time interval becomes longer as the traffic volume increases. Accordingly, for example, interval determiner 160 determines a predetermined time interval based on whether it is assumed that the driving operation by the user is frequently performed, for example, whether the traffic volume is heavy, whether vehicle 300 is located in a city area, or whether vehicle 300 is located in an expressway. For example, interval determiner 160 determines a predetermined time interval so that the predetermined time interval becomes longer as it is assumed that the driving operation by the user is more frequently performed, and determines a predetermined time interval so that the predetermined time interval becomes shorter as it is assumed that the driving operation by the user is less frequently performed.

Accordingly, awakening support apparatus 100 can present a presentation content item to the user at an appropriate frequency for prompting the user to awake by prompting the user to focus.

It should be noted that obtainer 110 may obtain a result of detection from a speed sensor that detects the speed of vehicle 300, an acceleration sensor that detects the acceleration of vehicle 300, and/or a gyro sensor that detects the steering angle of vehicle 300. It may be determined that the driving operation by the user is more frequently performed as change in the speed, acceleration, and/or steering angle of vehicle 300 increases.

Alternatively, for example, a predetermined time interval is set based on the sleepiness level of the user estimated by sleepiness estimator 120. For example, interval determiner 160 determines a predetermined time interval so that the predetermined time interval becomes shorter as the sleepiness level of the user becomes higher, and determines a predetermined time interval so that the predetermined time interval becomes longer as the sleepiness level of the user becomes lower.

Accordingly, awakening support apparatus 100 can present a presentation content item to the user at an appropriate frequency according to the sleepiness level of the user.

Alternatively, for example, a predetermined time interval may be a time interval arbitrarily determined in advance. Accordingly, for example, interval determiner 160 may determine a predetermined time interval so that presentation of a presentation content item is performed at a fixed time interval, such as every 30 seconds. It should be noted that, in this case, awakening support apparatus 100 does not necessarily include interval determiner 160.

Alternatively, for example, a predetermined time interval may be a time interval (presentation time) determined in advance for each presentation content item. For example, a predetermined time interval may be determined in advance so that presentation content item A is presented for 20 seconds, presentation content item B is presented for 40 seconds, presentation content item C is presented for 10 seconds. In other words, for example, a predetermined time interval may be determined in advance for each presentation content item so that a time interval between a timing at which presentation content item A is presented and a timing at which a subsequent presentation content item B is presented is 20 seconds, a time interval between the timing at which presentation content item B is presented and a timing at which a subsequent presentation content item C is presented is 40 seconds, and a time interval between the timing at which presentation content item C is presented and a timing at which a subsequent presentation content item D is presented is 10 seconds. For example, information indicating a time interval determined in advance for each presentation content item may be included in presentation information 181.

Controller 170 is a processing unit that presents one or more presentation content items selected by second selector 150 to the user. Specifically, controller 170 controls presentation apparatus 200 to present, by at least one of sound or an image, one or more presentation content items selected by second selector 150 to the user.

For example, when the sleepiness level estimated by sleepiness estimator 120 is greater than or equal to the first sleepiness threshold value, controller 170 presents one or more presentation content items selected by second selector 150 to the user. Specifically, when presentation determiner 130 determines that the sleepiness level estimated by sleepiness estimator 120 is greater than or equal to the first sleepiness threshold value, controller 170 presents one or more presentation content items selected by second selector 150 to the user.

Accordingly, awakening support apparatus 100 can present a presentation content item when the user becomes sleepy.

Moreover, for example, controller 170 presents any presentation content item among a group of presentation content items included in one category selected by first selector 140 to the user at a predetermined time interval. As described above, for example, second selector 150 repeatedly performs selecting one or more presentation content items from among a group of presentation content items associated with one category selected by first selector 140 while changing the one or more presentation content items. Controller 170 repeatedly performs presentation of one or more presentation content items selected by second selector 150 from among a group of presentation content items while changing the one or more presentation content items, at a predetermined time interval determined by interval determiner 160.

Accordingly, since presentation of a presentation content item to the user is periodically performed, awakening support apparatus 100 with a simple configuration can prevent an occurrence of a state in which the user is not awakened (i.e., the user is sleepy).

Figure 7:
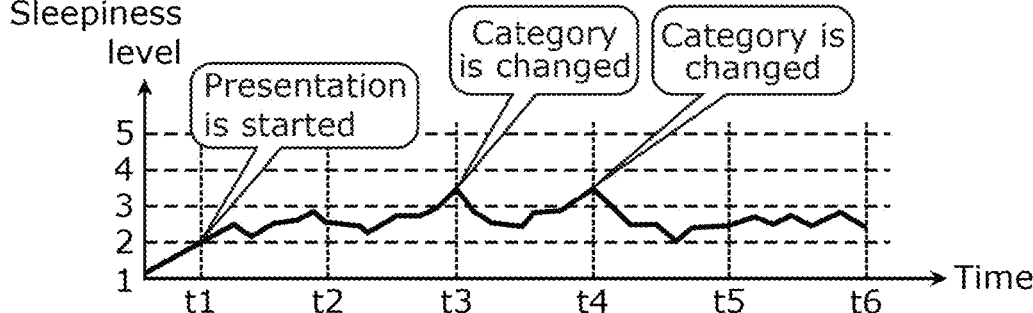
FIG. 7 is a diagram for explaining the relationship between presentation of a presentation content item by the awakening support apparatus according to the embodiment and sleepiness level of the user.

FIG. 7 is a diagram for explaining the relationship between presentation of a presentation content item by awakening support apparatus 100 according to the embodiment and sleepiness level of the user. In the example illustrated in FIG. 7, the first sleepiness threshold value is set to sleepiness level 2, and the second sleepiness threshold value is set to sleepiness level 3.

For example, when the user starts driving vehicle 300, obtainer 110 obtains a moving image in which the user is shown from image capturing apparatus 210. Sleepiness estimator 120 estimates the sleepiness level of the user based on the moving image obtained by obtainer 110.

Presentation determiner 130 constantly determines whether the sleepiness level of the user estimated by sleepiness estimator 120 exceeds sleepiness level 2. For example, when presentation determiner 130 determines that the sleepiness level of the user exceeds sleepiness level 2 at time t1, first selector 140 selects one category, second selector 150 selects one or more presentation content items, and controller 170 presents the one or more presentation content items. For example, first selector 140 selects the first category, second selector 150 selects presentation content item A associated with the first category, and controller 170 presents presentation content item A.

Moreover, interval determiner 160 determines a predetermined time interval. Controller 170 repeatedly presents, to the user, one or more presentation content items selected by second selector 150 from among a group of presentation content items associated with one category selected by first selector 140 while changing the one or more presentation content items, at the predetermined time interval determined by interval determiner 160. For example, at time t2, second selector 150 selects presentation content item B associated with the first category, and controller 170 presents presentation content item B.

Here, for example, when presentation determiner 130 determines that the sleepiness level of the user is higher than sleepiness level 3 at time t3, first selector 140 changes the one category currently selected to an other category, second selector 150 newly selects one or more presentation content items from among a group of presentation content items associated with the other category, and controller 170 presents the one or more presentation content items newly selected. For example, first selector 140 selects the second category, second selector 150 selects presentation content item C associated with the second category, and controller 170 presents presentation content item C.

Moreover, for example, although the sleepiness level of the user has become less than sleepiness level 3 because the one or more presentation content items had been changed at time t3, when presentation determiner 130 determines that the sleepiness level of the user is higher than sleepiness level 3 again at time t4, first selector 140 again changes the one category currently selected to an other category, second selector 150 again newly selects one or more presentation content items from among a group of presentation content items associated with the other category, and controller 170 again presents the one or more presentation content items newly selected. For example, first selector 140 selects the fourth category, second selector 150 selects presentation content item D associated with the fourth category, and controller 170 presents presentation content item D.

Moreover, for example, since the sleepiness level of the user is less than sleepiness level 3 at time t5, the category currently selected is not changed, second selector 150 selects presentation content item E associated with the fourth category, and controller 170 presents presentation content item E.

Moreover, for example, since the sleepiness level of the user is less than sleepiness level 3 also at time t6, the category currently selected is not changed, second selector 150 selects presentation content item F associated with the fourth category, and controller 170 presents presentation content item F.

It should be noted that when the sleepiness level of the user is less than a predetermined sleepiness level, controller 170 may stop presenting a presentation content item currently selected. The predetermined sleepiness level may be the first sleepiness threshold value and need not be the first sleepiness threshold value. For example, the user can be more reliably prompted to awake by setting the predetermined sleepiness level to a value less than the first sleepiness threshold value.

Moreover, when the sleepiness level of the user is maintained to be greater than or equal to sleepiness level 2 for a predetermined time period, first selector 140 may change one category currently selected. It should be noted that the predetermined time period may be arbitrarily set.

Moreover, one category and one or more presentation content items currently selected may be changed at a fixed time interval or each time presentation of one or more presentation content items is performed a predetermined number of times. For example, one category and one or more presentation content items currently selected may be changed in the following order: presentation content item G in the first category, presentation content item H in the first category, presentation content item I in the second category, and presentation content item J in the second category.

It should be noted that when second selector 150 selects, for example, two or more presentation content items, controller 170 may cause presentation apparatus 200 to present the two or more presentation content items. For example, when second selector 150 selects both a presentation content item to be displayed as an image and a presentation content item to be outputted by sound that are the same in content, controller 170 may cause presentation apparatus 200 to present the presentation content item by the image and sound.

Each of processing units such as sleepiness estimator 120, presentation determiner 130, first selector 140, second selector 150, interval determiner 160, and controller 170 is, for example, realized as one or more memories storing a program and one or more processors that execute the program. It should be noted that each processing unit may be realized as software executed by a processor or as hardware such as an electric circuit including one or more electronic components.

Storage 180 is a storage device that stores presentation information 181 and information indicating a threshold value that is used by each processing unit, and the like. Storage 180 is realized as, for example, a Hard Disk Drive (HDD), flush memory, or the like.

Presentation information 181 is information including a plurality of categories and groups of presentation content items associated with the plurality of categories. Presentation information 181 includes, for example, information shown in FIG. 4 to FIG. 6.

Presentation apparatus 200 is an apparatus including a device that outputs sound and/or a device that displays an image. Presentation apparatus 200 is realized as, for example, a sound device such as an amplifier and a loudspeaker, and/or a display. Presentation apparatus 200 is controlled by controller 170 to present, by sound and/or an image (e.g., text), a presentation content item selected by second selector 150 to the user.

It should be noted that when presentation apparatus 200 includes a device, such as a display, that displays a presentation content item by an image and the presentation content item is other than a presentation content item related to driving, controller 170 may control presentation apparatus 200 so that the presentation content item is presented at a timing when vehicle 300 is stopped. Information indicating whether presentation apparatus 200 includes a display and/ or a sound device may be stored in advance in storage 180. Moreover, controller 170 may determine a traveling state such as whether vehicle 300 is traveling or stopped, based on a result of detection obtained by obtainer 110 from a speed sensor that detects the speed of vehicle 300, an acceleration sensor that detects the acceleration of vehicle 300, and/or a gyro sensor that detects the steering angle of vehicle 300.

Image capturing apparatus 210 is a camera that capturing an image of the user. Image capturing apparatus 210 generates, for example, an image in which the face of the user is shown. Image capturing apparatus 210 may be an image sensor that has sensitivity to a visible light range or may be an infrared image sensor or thermal image sensor. The image is, for example, a moving image and may be a static image.

Surrounding environment sensor 220 is a sensor that detects the environment surrounding vehicle 300. Surrounding environment sensor 220 is realized as, for example, a temperature sensor, a humidity sensor, a camera, and/or a distance measuring sensor.

It should be noted that image capturing apparatus 210 and surrounding environment sensor 220 may be provided to vehicle 300 or provided to a support such as a utility pole.

Moreover, obtainer 110 may obtain information indicating a traffic volume from a server device that is located outside of vehicle 300. In this case, surrounding environment sensor 220 is not necessarily communicably connected to awakening support apparatus 100.

[Order of Steps]

Next, the order of steps performed by awakening support apparatus 100 is described.

Figure 8:
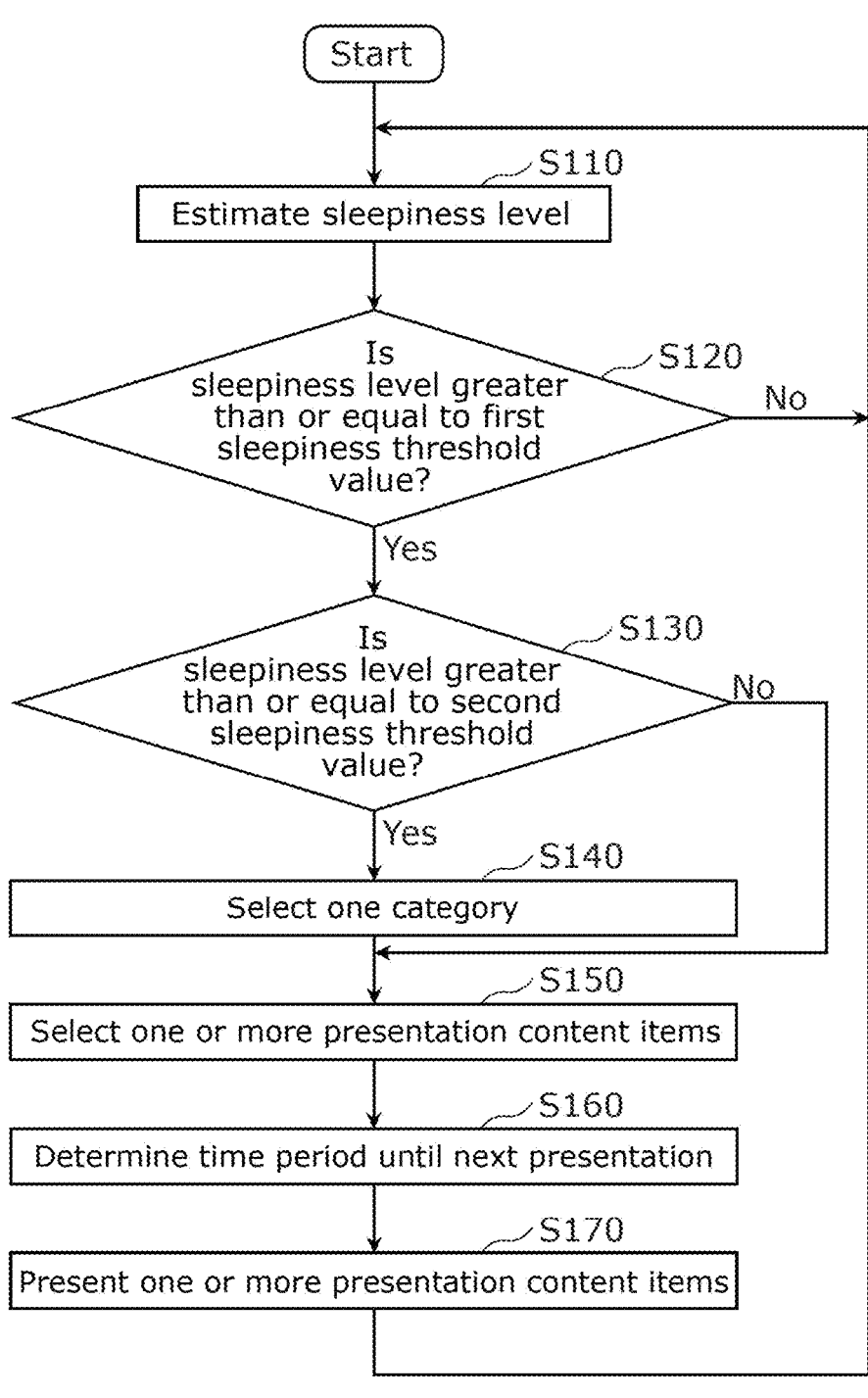
FIG. 8 is a flowchart illustrating the order of steps performed by the awakening support apparatus according to the embodiment.

FIG. 8 is a flowchart illustrating the order of steps performed by awakening support apparatus 100 according to the embodiment.

First, sleepiness estimator 120 estimates the sleepiness level of a user (S110). For example, sleepiness estimator 120 estimates the sleepiness level of the user, based on an image in which the user is shown obtained by obtainer 110.

Next, presentation determiner 130 determines whether the sleepiness level of the user estimated by sleepiness estimator 120 is greater than or equal to a first sleepiness threshold value (S120).

When presentation determiner 130 determines that the sleepiness level of the user estimated by sleepiness estimator 120 is less than the first sleepiness threshold value (S120: No), the processing returns to step S110.

In contrast, when presentation determiner 130 determines that the sleepiness level of the user estimated by sleepiness estimator 120 is greater than or equal to the first sleepiness threshold value (S120: Yes), presentation determiner 130 further determines whether the sleepiness level of the user estimated by sleepiness estimator 120 is greater than or equal to a second sleepiness threshold value (S130).

It should be noted that when the result of step S120 is Yes and no presentation content item has been presented by controller 170, the processing may skip to step S140.

When presentation determiner 130 determines that the sleepiness level of the user estimated by sleepiness estimator 120 is greater than or equal to the second sleepiness threshold value (S130: Yes), first selector 140 selects one category from among a plurality of categories (S140).

It should be noted that when there has been one category currently selected and the result of step S130 is Yes, first selector 140 changes the one category currently selected to an other category.

In contrast, when presentation determiner 130 determines that the sleepiness level of the user estimated by sleepiness estimator 120 is less than the second sleepiness threshold value (S130: No) or after step S140, second selector 150 selects one or more presentation content items from among a group of presentation content items associated with the one category selected at step S140 by first selector 140 (S150).

Next, interval determiner 160 determines a time period until the one or more presentation content items selected at step S150 by second selector 150 are presented (S160). In other words, interval determiner 160 determines a timing at which controller 170 presents, to the user, the one or more presentation content items selected at step S150 by second selector 150. For example, when there has been a presentation content item presented by controller 170, interval determiner 160 determines a time interval between a timing at which the presentation content item has been presented and a timing at which controller 170 subsequently presents the one or more presentation content items selected at step S150. When no presentation content item has been presented by controller 170, interval determiner 160 may determine that controller 170 immediately presents the one or more presentation content items selected at step S150.

Next, controller 170 presents, to the user, the one or more presentation content items selected at step S150 by second selector 150, at the timing determined at step S160 by interval determiner 160 (S170). Moreover, after step S170 is performed, the processing returns to step S110.

It should be noted that when the result of step S120 is No and there have been one or more presentation content items presented by controller 170, controller 170 may stop presenting the one or more presentation content items.

[Conclusion]

As described above, awakening support apparatus 100 according to the embodiment is an awakening support apparatus for prompting a user inside vehicle 300 to awake by prompting the user to focus. Awakening support apparatus 100 includes first selector 140 that selects one category from among a plurality of categories associated with groups of presentation content items, the groups being mutually different in type of focus mode in which the user is prompted to focus, second selector 150 that selects one or more presentation content items from among a group of presentation content items associated with the one category selected by first selector 140, and controller 170 that presents the one or more presentation content items selected by second selector 150 to the user.

Accordingly, the user is prompted to awake by being prompted to focus by the one or more presentation content items appropriately selected by awakening support apparatus 100 from among the group of presentation content items included in the groups that are mutually different in type of focus mode in which the user is prompted to focus. As an awakening method, a method for prompting a user to be careful and/or focus (e.g., warning a user of a dangerous place) is known. Here, it is difficult to cause a user to stay focused, due to habituation. This is considered to be related to brain fatigue. Therefore, awakening support apparatus 100 prompts a user to focus while switching between a plurality of types of focus modes. For example, since a part of the user's brain used is switched by prompting the user to focus while switching between the plurality of types of focus modes, brain fatigue can be suppressed. Thus, awakening support apparatus 100 can cause the user to stay focused. Therefore, awakening support apparatus 100 can prevent the user from becoming less easily awakened.

It should be noted that NPL 1 is known as an example indicating that an active part of a brain is different depending on the focus mode. As described in NPL 1, it is known that an active part and an inactive part of a brain are different depending on the focus mode, and the present disclosure utilizes such a brain behavior.

Moreover, a time interval between timings at each of which presentation of a presentation content item is performed (i.e., presentation frequency) may be a fixed time interval; may be determined for each presentation content item; may be determined based on a condition such as the frequency of driving operation of vehicle 300, whether the traffic volume on a road on which vehicle 300 is traveling is heavy, whether vehicle 300 is traveling in a city area, or whether vehicle 300 is traveling in an expressway; or may be determined based on the sleepiness level of the user.

For example, the frequency of driving operation may be determined based on: log information that is related to the traveling state, such as speed, of vehicle 300 and is obtained via a control area network (CAN) or the like; or a result of detection performed by a millimeter wave radar that is provided to the outside of vehicle 300 and detects vehicle 300. For example, whether the frequency of the driving operation is high or low may be determined based on: whether the frequency of the driving operation determined based on the above-described information is less than a predetermined threshold value; or whether change amount of the driving operation per unit time is less than a predetermined threshold value.

For example, awakening support apparatus 100 may further include sleepiness estimator 120 that estimates a sleepiness level indicating the degree of sleepiness of a user based on state information indicating a result of detection performed by a state sensor (image capturing apparatus 210 in the present embodiment) that detects the state of the user.

Moreover, each of a timing at which a presentation content item is presented and a timing at which a presentation content item is changed may be determined based on a sleepiness level, may be a timing at which presentation has been performed a predetermined number of times, or may be a timing at which a fixed time period has elapsed.

Moreover, a category may be arbitrarily selected from among first to fourth categories. A category may be selected based on a predetermined condition. For example, the first category is selected when the frequency of driving operation of vehicle 300 is high or when the traffic volume on a road on which vehicle 300 is traveling is heavy.

Moreover, when presentation apparatus 200 includes a display, a timing at which a presentation content item is presented may be determined based on the presentation mode (e.g., image or sound) of the presentation content item. For example, a presentation content item other than a presentation content item related to driving is presented when vehicle 300 is stopped.

Moreover, for example, the present disclosure may be realized as an awakening support method executed by a computer. Specifically, an awakening support method according to the present disclosure is an awakening support method for prompting a user inside vehicle 300 to awake by prompting the user to focus. The awakening support method includes selecting one category from among a plurality of categories associated with groups of presentation content items, the groups being mutually different in type of focus mode in which the user is prompted to focus (S140), selecting one or more presentation content items from among a group of presentation content items associated with the one category (S150), and presenting the one or more presentation content items to the user (S170).

Accordingly, the awakening support method exhibits the same effect as awakening support apparatus 100.

It should be noted that the present disclosure may be realized as a program for causing a computer to execute the steps included in the awakening support method. Moreover, the present disclosure may be realized as a computer readable non-transitory recording medium, such as a CD-ROM, having the program recorded thereon. Furthermore, the present disclosure may be realized as information, data, or a signal that indicates the program. Then, the program, the information, the data, or the signal may be distributed via a communication network such as the Internet.

OTHER EMBODIMENTS

Although an awakening support apparatus and the like according to one or more aspects have been described based on the embodiment hereinabove, the present disclosure is not limited to the embodiment. Forms obtained by various modifications to the embodiment that can be conceived by a person skilled in the art as well as forms realized by combining constituent elements in the embodiment are included in the scope of the present disclosure as long as they do not depart from the gist of the present disclosure.

For example, a method for communicating between awakening support apparatus 100, image capturing apparatus 210, and surrounding environment sensor 220 in the above-described embodiment is not particularly limited. When wireless communication is performed between the apparatuses, the method of the wireless communication (communication standard) is, for example, short-range wireless communication such as ZigBee (registered trademark), Bluetooth (registered trademark), or a local area network (LAN). Alternatively, the method of the wireless communication (communication standard) may be communication via a wide-area communication network such as the Internet. Moreover, instead of wireless communication, wired communication may be performed between the apparatuses. Specifically, the wired communication is power line communication (PLC), communication using a wired LAN, or the like.

Moreover, in the above-described embodiment, a process performed by a specific processing unit may be performed by another processing unit. Furthermore, the order of a plurality of processes may be changed or the plurality of processes may be performed in parallel with each other. Furthermore, the constituent elements included in awakening support apparatus 100 may be assigned to a plurality of other apparatuses. For example, constituent elements included in one apparatus may be included in other apparatuses.

For example, processes in the above-described embodiment may be realized by means of integrated processing using a single apparatus (system), or realized by means of decentralized processing using a plurality of apparatuses. Moreover, the program may be executed by a single processor or a plurality of processors. In other words, the program may be executed by means of integrated processing or decentralized processing.

Moreover, in the above-described embodiment, all or part of the constituent elements of the processing units included in awakening support apparatus 100 may be configured by dedicated hardware or may be realized by executing a software program suitable for each of the constituent elements. Each of the constituent elements may be realized by a program executing unit, such as a central processing unit (CPU) or a processor, reading and executing a software program recorded on a recording medium, such as an HDD or semiconductor memory.

Moreover, the constituent elements of the processing units included in awakening support apparatus 100 may be configured by one or more electric circuits. Each of the one or more electric circuits may be a general circuit or a dedicated circuit.

For example, the one or more electric circuits may include a semiconductor device, an integrated circuit (IC), large scale integration (LSI), or the like. The IC or the LSI may be integrated on a single chip or a plurality of chips. Although the one or more electronic circuits are referred to as an IC or LSI here, the one or more electronic circuits may also be referred to as a system LSI, very large scale integration (VLSI), or ultra large scale integration (ULSI), depending on the scale of the integration. Moreover, a field programmable gate array (FPGA) that is programmed after LSI is manufactured may also be used for the same purpose.

Additionally, embodiments obtained through various modifications to the embodiment that can be conceived by a person skilled in the art as well as embodiments realized by arbitrarily combining the constituent elements and functions in the embodiment are included in the present disclosure as long as they do not depart from the gist of the present disclosure.

Further Information about Technical Background to this Application

The disclosures of the following patent applications including specification, drawings, and claims are incorporated herein by reference in their entirety: Japanese Patent Application No. 2022-055203 filed on Mar. 30, 2022, and PCT International Application No. PCT/JP2023/003522 filed on Feb. 3, 2023.

INDUSTRIAL APPLICABILITY

The present disclosure is used as an awakening support apparatus that prompts a user to awake.

What is claimed is:

1. An awakening support apparatus for prompting a user inside a vehicle to awake by prompting the user to focus, the awakening support apparatus comprising:
   a first selector that selects one category from among a plurality of categories associated with groups of presentation content items, the groups being mutually different in type of focus mode in which the user is prompted to focus;
   a second selector that selects one or more presentation content items from among a group of presentation content items associated with the one category; and
   a controller that presents the one or more presentation content items to the user, wherein
   the plurality of categories include:
      (i) a category associated with, among the groups of presentation content items, a group of presentation content items each of which is related to a different specific situation, and
      (ii) a category associated with, among the groups of presentation content items, a group of presentation content items each of which is related to a different unspecific situation.

2. The awakening support apparatus according to claim 1, wherein
   each presentation item of the groups of presentation content items is a question for the user or an instruction for causing the user to perform a predetermined operation.

3. The awakening support apparatus according to claim 1, wherein
   the plurality of categories include:
      (i) a category associated with, among the groups of presentation content items, a group of presentation content items each of which is related to a different situation in present, and
      (ii) a category associated with, among the groups of presentation content items, a group of presentation content items each of which is related to a different situation in past or future.

4. The awakening support apparatus according to claim 1, wherein
   the plurality of categories include:
      (i) a category associated with, among the groups of presentation content items, a group of presentation content items each of which is related to a different specific situation in present;
      (ii) a category associated with, among the groups of presentation content items, a group of presentation content items each of which is related to a different specific situation in past or future;
      (iii) a category associated with, among the groups of presentation content items, a group of presentation content items each of which is related to a different unspecific situation in the present; and
      (iv) a category associated with, among the groups of presentation content items, a group of presentation content items each of which is related to a different unspecific situation in the past or future.

5. The awakening support apparatus according to claim 1, further comprising:
   a sleepiness estimator that estimates a sleepiness level indicating a degree of sleepiness of the user, based on state information indicating a result of detection performed by a state sensor that detects a state of the user, wherein
   the first selector selects the one category according to the sleepiness level estimated by the sleepiness estimator.

6. The awakening support apparatus according to claim 5, wherein
   when the sleepiness level estimated by the sleepiness estimator is greater than or equal to a first sleepiness threshold value, the controller presents the one or more presentation content items to the user.

7. The awakening support apparatus according to claim 6, wherein
   when the sleepiness level estimated by the sleepiness estimator is greater than or equal to a second sleepiness threshold value that is higher than the first sleepiness threshold value,
   the first selector changes the one category to an other category that is other than the one category among the plurality of categories, and
   the second selector selects one or more presentation content items from among a group of presentation content items associated with the other category.

8. The awakening support apparatus according to claim 1, wherein
   each time a predetermined time elapses, the first selector changes the one category to an other category that is other than the one category among the plurality of categories, and
   the second selector selects one or more presentation content items from among a group of presentation content items associated with the other category.

9. The awakening support apparatus according to claim 1, wherein
   each time presentation of any presentation content item among the group of presentation content items associated with the one category is performed a predetermined number of times, the first selector changes the one category to an other category that is other than the one category among the plurality of categories, and the second selector selects one or more presentation content items from among a group of presentation content items associated with the other category.

10. The awakening support apparatus according to claim 1, wherein the first selector selects the one category based on a predetermined order of the plurality of categories.

11. The awakening support apparatus according to claim 1, wherein the first selector randomly selects the one category from among the plurality of categories.

12. The awakening support apparatus according to claim 1, wherein the first selector selects the one category based on environment information indicating a result of detection performed by a surrounding environment sensor that detects an environment surrounding the vehicle.

13. The awakening support apparatus according to claim 12, wherein the environment information indicates a traffic volume around the vehicle, and when the traffic volume indicated by the environment information is greater than or equal to a predetermined amount, the first selector selects, as the one category, a category associated with, among the groups of presentation content items, a group of presentation content items each of which is related to a different specific situation in present.

14. The awakening support apparatus according to claim 1, wherein the controller presents, to the user, any presentation content item among the group of presentation content items associated with the one category at a predetermined time interval.

15. The awakening support apparatus according to claim 14, wherein the predetermined time interval is set based on environment information indicating a result of detection performed by a surrounding environment sensor that detects an environment surrounding the vehicle.

16. The awakening support apparatus according to claim 14, further comprising:

a sleepiness estimator that estimates a sleepiness level indicating a degree of sleepiness of the user, based on state information indicating a result of detection performed by a state sensor that detects a state of the user, wherein the predetermined time interval is set based on the sleepiness level estimated by the sleepiness estimator.

17. The awakening support apparatus according to claim 1, wherein the controller controls a presentation apparatus to present the one or more presentation content items to the user by at least one of sound or an image.

18. An awakening support method for prompting a user inside a vehicle to awake by prompting the user to focus, the awakening support method comprising:

selecting one category from among a plurality of categories associated with groups of presentation content items, the groups being mutually different in type of focus mode in which the user is prompted to focus;

selecting one or more presentation content items from among a group of presentation content items associated with the one category; and presenting the one or more presentation content items to the user, wherein the plurality of categories include:

(i) a category associated with, among the groups of presentation content items, a group of presentation content items each of which is related to a different specific situation, and (ii) a category associated with, among the groups of presentation content items, a group of presentation content items each of which is related to a different unspecific situation.

* * * * *